United States Patent
Beard et al.

(10) Patent No.: US 9,884,279 B2
(45) Date of Patent: Feb. 6, 2018

(54) FILTER APPARATUS WITH EJECTION ARRANGEMENT

(71) Applicants: John H. Beard, Olathe, KS (US); Stephen Schweitzer, Kearney, NE (US)

(72) Inventors: John H. Beard, Olathe, KS (US); Stephen Schweitzer, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 743 days.

(21) Appl. No.: 14/201,013

(22) Filed: Mar. 7, 2014

(65) Prior Publication Data

US 2014/0183115 A1 Jul. 3, 2014

Related U.S. Application Data

(63) Continuation of application No. 13/360,181, filed on Jan. 27, 2012, now Pat. No. 8,709,247.

(51) Int. Cl.
| | |
|---|---|
| *B01D 35/30* | (2006.01) |
| *B01D 27/08* | (2006.01) |
| *B01D 29/21* | (2006.01) |
| *B01D 29/96* | (2006.01) |
| *B01D 27/00* | (2006.01) |

(52) U.S. Cl.
CPC .......... *B01D 35/306* (2013.01); *B01D 27/00* (2013.01); *B01D 27/08* (2013.01); *B01D 29/21* (2013.01); *B01D 29/96* (2013.01); *B01D 35/30* (2013.01); *B01D 2201/291* (2013.01); *B01D 2201/295* (2013.01); *B01D 2201/34* (2013.01); *B01D 2201/4015* (2013.01); *B01D 2201/4084* (2013.01)

(58) Field of Classification Search
None
See application file for complete search history.

(56) References Cited

U.S. PATENT DOCUMENTS

| | | |
|---|---|---|
| 5,300,223 A | 4/1994 | Wright |
| 5,788,859 A | 8/1998 | Biere |
| 6,235,194 B1 | 5/2001 | Jousset |
| 6,251,273 B1 | 6/2001 | Jawurek et al. |
| 6,500,335 B2 | 12/2002 | Janik et al. |
| 6,921,479 B2 | 7/2005 | Ardes |
| 8,057,669 B2 | 11/2011 | Beard et al. |
| 2005/0178715 A1 | 8/2005 | Thomas et al. |
| 2009/0301950 A1 | 12/2009 | Weindorf |
| 2010/0044295 A1 | 2/2010 | Honermann et al. |
| 2010/0101993 A1* | 4/2010 | Wells ..................... B01D 29/21 210/455 |
| 2010/0140155 A1 | 6/2010 | Gift et al. |
| 2012/0012513 A1* | 1/2012 | Jokschas ................ B01D 29/21 210/232 |

FOREIGN PATENT DOCUMENTS

EP 2151269 A1 2/2010

* cited by examiner

*Primary Examiner* — Thomas M Lithgow
(74) *Attorney, Agent, or Firm* — Reinhart Boerner Van Deuren P.C.

(57) ABSTRACT

A filter cartridge including catches for ejecting the filter cartridge from a filter housing as the filter cartridge and filter housing are removed from a filter base is provided. The catches are configured to engage corresponding catches of the filter base to limit axial motion of the filter cartridge as the filter cartridge and filter housing are threadedly removed from the filter base.

21 Claims, 11 Drawing Sheets

FILTER APPARATUS WITH EJECTION ARRANGEMENT

CROSS-REFERENCE TO RELATED PATENT APPLICATIONS

This patent application is a continuation of co-pending U.S. patent application Ser. No. 13/360,181, filed Jan. 27, 2012, the entire teachings and disclosure of which are incorporated herein by reference thereto.

FIELD OF THE INVENTION

The present invention relates to filtration devices and more particularly to replaceable filter cartridges, and even more particularly to mechanisms and methods of removing a filter cartridge from a filter housing.

BACKGROUND OF THE INVENTION

Filtration systems are used for filtering fluids. For instance, filtration systems are used to filter impurities from fuel, hydraulic fluids, water, and other flowing liquids. One particular filter arrangement uses a filter base to which a filter element is attached. The filter base provides an inlet through which dirty fluid enters the filter system and an outlet through which cleaned fluid exits the filter system. The filter element performs the function of removing the undesirable impurities from the fluid.

For some systems, such as engine fuel systems, hydraulic power systems, and lubrication systems, the filter element includes filter media that is replaced at predetermined maintenance intervals or when otherwise spent. Therefore, it is desirable to provide easy methods for replacement of the filter media.

In some embodiments, the filter element includes a reusable housing in which a disposable filter cartridge, which includes the filter media, is positioned during operation. The housing may also be referred to as a bowl. In many instances, the filter cartridge is sealed to the filter housing which can make it difficult to remove the replaceable filter cartridge at service intervals. One problem associated with removal of the replaceable filter cartridge is that this can create a significant mess for the user if it is difficult to remove the filter cartridge from the outer housing.

The present invention relates to the current state of the art as it relates to filter systems that utilize a reusable housing and a replaceable filter cartridge by making it easier to remove the filter cartridge from the filter housing.

BRIEF SUMMARY OF THE INVENTION

Embodiments of the present invention provide improved removal of a filter cartridge from a filter housing while removing a filter element formed from the filter cartridge and the filter housing from a filter base.

In a particular embodiment, a filter arrangement including a filter base, a filter element and an auto-ejecting interface is provided. The filter element is selectively mountable to the filter base. The filter element includes an outer housing including a sidewall defining an open end. The filter element also includes a filter cartridge axially received within the filter housing slidable between a released position relative to the housing where the filter cartridge can be removed from the housing using a first amount of axial force (in one embodiment gravity when the filter element is inverted) and an inserted position relative to the housing where a second amount of force, greater than the first amount of force, is required to axially transition the filter element relative to the filter housing to the released position. The filter cartridge includes filter media for filtering fluid passing through the filter element. The auto-ejecting interface is provided between the filter element and the filter base and is configured to transition the filter cartridge to the released position from the inserted position as the filter element is transitioned from a mounted state to an unmounted state relative to the filter base.

In one embodiment, the filter cartridge engages the housing in the inserted state with sufficient force preventing the filter cartridge from being transitioned from the inserted position to the released position under the force of gravity when the filter element is removed from the filter base and inverted.

In one embodiment, the auto-ejecting interface includes a filter base abutment shelf and a filter cartridge abutment catch. The filter cartridge abutment catch axially engages the filter base abutment shelf axially limiting motion of the filter cartridge relative to the filter base as the filter element is transitioned from the mounted state to the unmounted state, such that the filter cartridge transitions from the inserted state to the released state as the filter element is transitioned from the mounted state to the unmounted state along a mounting axis.

In one embodiment, the filter base abutment shelf includes a first abutment surface facing axially away from the filter media when the filter element is attached to the filter base and the filter cartridge abutment catch includes a second abutment surface axially facing the filter media. The first abutment surface engages the second abutment surface when the filter cartridge abutment catch axially engages the filter base abutment shelf.

In one embodiment, the filter base abutment shelf extends angularly about the mounting axis of the filter arrangement a greater amount than the filter cartridge abutment, the filter element transitions from the mounted state to the unmounted state along the mounting axis.

In one embodiment, the filter cartridge abutment catch includes an axially extending leg portion and a head portion extending radially outward from the leg portion. The filter base abutment shelf includes a radially inward extending flange portion. The radially inward extending flange portion and the radially outward extending catch portion axially engaging when the filter cartridge abutment catch axially engages the filter base abutment shelf.

In one embodiment, the leg portion is configured to flex radially to adjust the radial position of the catch portion to permit the catch portion to pass axially past the radially inward extending flange portion as the filter element moves axially along the mounting axis to the mounted state from the unmounted state while the filter element is mounted to the filter base.

In one embodiment, the filter housing includes at least one housing thread that cooperates with at least one filter base thread of the filter base for selectively mounting the filter element to the filter base by rotating the housing about the mounting axis in a first angular direction. The cooperation between the filter base thread and the housing thread causing the filter element to be drawn axially towards the filter base along the mounting axis as the housing is rotated about the mounting axis in the first angular direction.

In one embodiment, the filter cartridge translates a first distance parallel to the mounting axis relative to the housing between the released position and the inserted position and wherein the filter housing translates at least the first distance parallel to the mounting axis relative to the filter base between the mounted state and the unmounted state.

In one embodiment, a removal notch is angularly adjacent an end of the radially inward extending flange portion. The removal notch is configured to allow the head portion to pass axially therethrough when the head portion is angularly aligned therewith to disengage the filter cartridge from the filter base. The removal notch allows for less or no radial deformation of the leg portion as the head portion passes axially therethrough as compared to passing axially past the inward extending flange portion.

In one embodiment, the filter cartridge is slidable relative to the housing at a sliding interface. The sliding interface includes a radially directed annular seal sliding on an annular surface. The annular seal engaging the annular surface in the inserted position and the annular seal substantially disengaged from the annular surface in the released position.

In one embodiment, the filter base includes an annular skirt extending angularly around and axially parallel to the mounting axis. The annular skirt receives the open end of the sidewall of the housing axially therein. The housing includes at least one housing thread that cooperates with at least one filter base thread formed in the annular skirt of the filter base for selectively mounting the filter element to the filter base by rotating the housing about the mounting axis in a first angular direction. The cooperation between the filter base thread and the housing thread causing the filter element to be drawn axially towards the filter base along the mounting axis as the housing is rotated about the mounting axis in the first angular direction. The filter cartridge abutment catch being provided by the filter cartridge.

In one embodiment, the filter cartridge includes an end cap positioned proximate the open end of the housing in the inserted position. The end cap including the filter cartridge abutment catch.

In another embodiment, a filter cartridge is provided. The filter cartridge is configured for insertion into a housing of a filter element that is selectively mountable to a filter base. The housing has a radially inward directed sealing surface and a radially outward directed housing thread. The filter base has an annular skirt defining at least one base thread engageable with the housing thread. The filter base also defining a radially extending filter base abutment shelf. The filter cartridge includes filter media, a first end cap, an outer rim, and a filter cartridge abutment catch. The first end cap is attached to the filter media. The outer rim engages the radially inward directed sealing surface when installed. The filter cartridge abutment catch includes an axially extending leg portion and a head portion extending radially from the leg portion. The radially extending head portion is configured to axially engage the radially extending filter base abutment shelf to impede motion of the filter cartridge relative to the filter base when the filter element is axially removed from the filter base.

In one embodiment, the leg portion is configured to flex radially to adjust the radial position of the head portion to permit the head portion to pass axially past the radially extending abutment shelf as the filter element moves axially along a mounting axis as the filter element is mounted to the filter base.

In one embodiment, the head portion extends radially outward.

In another embodiment, the filter cartridge abutment catch is part of the first end cap.

In another embodiment, a filter cartridge is provided. The filter cartridge includes a tubular ring of filter media; a first end cap; a filter cartridge abutment catch and a radially outward directed seal. The first end cap is attached to a first end of the filter media. The filter cartridge abutment catch includes an axially extending leg portion and a head portion extending radially from the leg portion. The radially extending head portion defines an abutment surface axially facing towards the filter media. The radially outward directed first seal is proximate a radially outer rim of the first end cap for sealing the end cap to a filter housing.

In one embodiment, the filter cartridge abutment catch is part of the first end cap. The leg portion extends axially outward from a body portion of the first end cap and away from the filter media. The head portion extends radially over a portion of the body portion and forming an undercut region therebetween.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
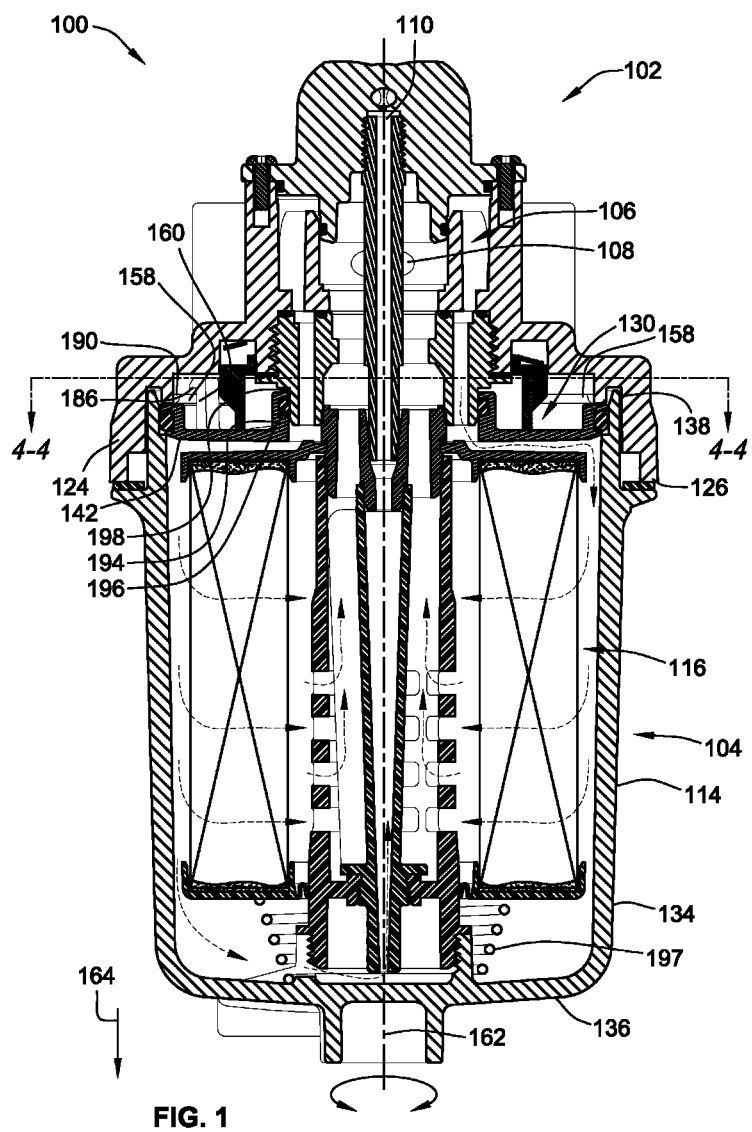
FIG. 1 is a cross-sectional illustration of a filter arrangement according to an embodiment of the present invention.

FIG. 1 is a simplified cross-sectional illustration of a filter arrangement 100 according to a first embodiment of the present invention. Filter arrangement 100 is used for removing impurities from a fluid. More particularly, the filter arrangement 100 can be used to remove particulate, as well as liquid (i.e. water), impurities from the fluid flowing therethrough. However, embodiments of the filter arrangement 100 need not filter both particulates and liquid from the fluid while remaining within the teachings of the present invention.

The filter arrangement 100 generally includes a filter base 102 and a filter element 104 that is removably attached to the filter base 102.

The filter base 102 generally includes a fluid inlet 106, a clean fluid outlet 108, and a return port 110. The dirty fluid inlet 106 is operably fluidly coupled to a source of dirty fluid such as a pump, engine, hydraulic system, fuel supply, etc. Fluid that is cleaned by the filter arrangement 100 exits through the clean fluid outlet 108 and is used by a downstream system. The return port 110 is operably coupled to an outlet or storage where impurities that have been removed from the fluid can be drained from the filter element 104. More particularly, in one embodiment, the return port 110 is operably coupled to the fluid storage tank of the system. Impurities such as water that are removed from the fluid can be drained back to the storage tank through the return port 110. Not all embodiments and implementations of the invention require a return port 110.

The filter element 104 is selectively mountable to the filter base 102 and is generally formed from a filter housing 114 (alternatively referred to as "bowl 114") and a filter cartridge 116.

Figure 3:
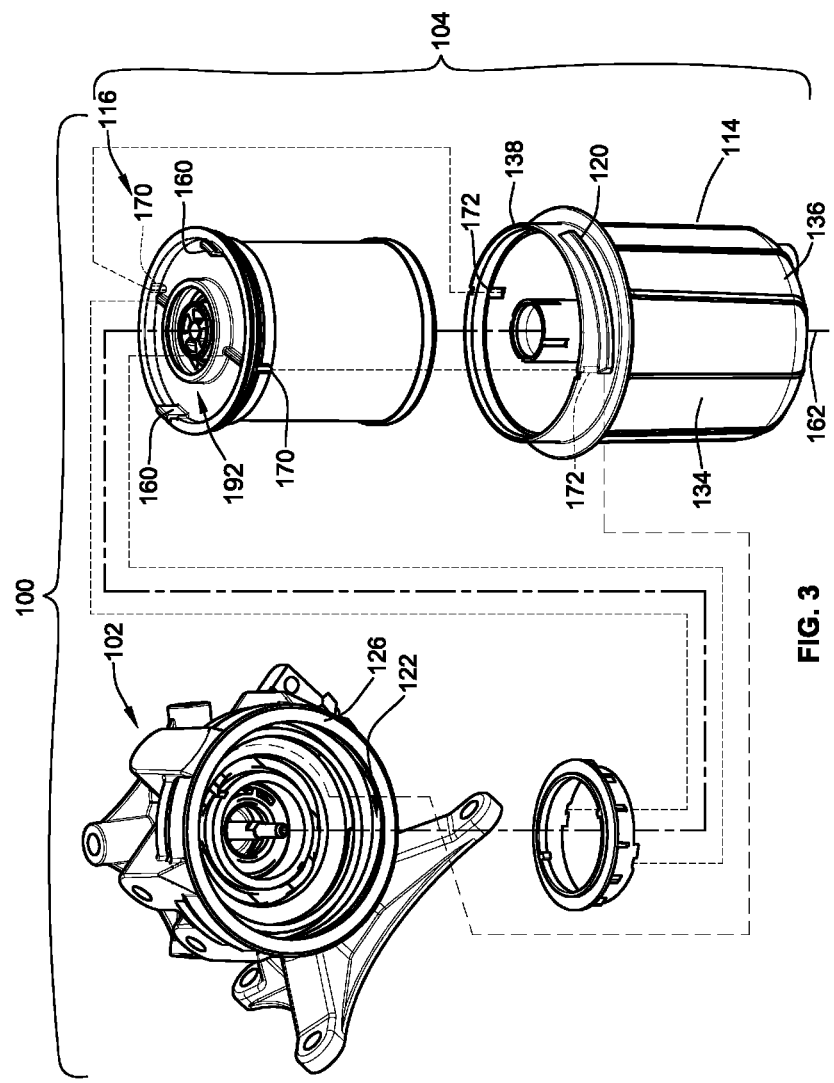
FIG. 3 is a perspective cross-sectional illustration of the filter arrangement of FIG. 1.

With additional reference to FIG. 3, the filter element 104 is preferably threadedly attached to the filter base 102 with at least one cooperating thread arrangement between the filter base 102 and filter housing 114 such that rotation of the filter element 104 about axis 162 mounts the element 104 to the filter base 102 and rotation in the opposite direction removes the filter element 104 from the filter base 102. In the illustrated embodiment, the filter housing 114 has a pair of threads 120 that cooperate with a corresponding set of threads of the filter base 102 (see e.g. FIG. 3). The filter base 102 includes an annular skirt portion 124 that defines the threads 122 that cooperate with corresponding ones of threads 120 of the filter element rotatably securing the filter element to the filter base 102.

With reference to FIG. 1, as the filter element 104 is rotated relative to the filter base 102 about axis 162, the filter element 104 is axially drawn into an open end 126 of the annular skirt 124 along axis 162. As the filter element 104 is axially drawn into the annular skirt portion 124, the filter element 104 will operably engage the filter base 102 to define various flow passages through the filter arrangement 100. More particularly, the filter element 104 will engage the filter base 102 to define a dirty fluid flow, a clean fluid flow that is separated from the dirty fluid flow by filter media of the filter element 116 and a evacuation flow for evacuating the particulates through return port 110.

Further, the filter arrangement 100 includes a torsion lock arrangement 130 that acts between the filter element 104 and filter base 102. Details of the torsion lock arrangement 130 are described in U.S. Pat. No. 8,057,669, filed Jun. 16, 2008, entitled "Filter Element and Filter Assembly Including Locking Mechanism," to Beard et al., the teachings and disclosures of which are incorporated herein by reference thereto. The torsion lock arrangement 130 is used to prevent loosening of the filter element 104 relative to the filter base 102 by inhibiting rotation in an opposite direction about axis 162 as required to mount the filter element 104 to the filter base 102.

Figure 2:
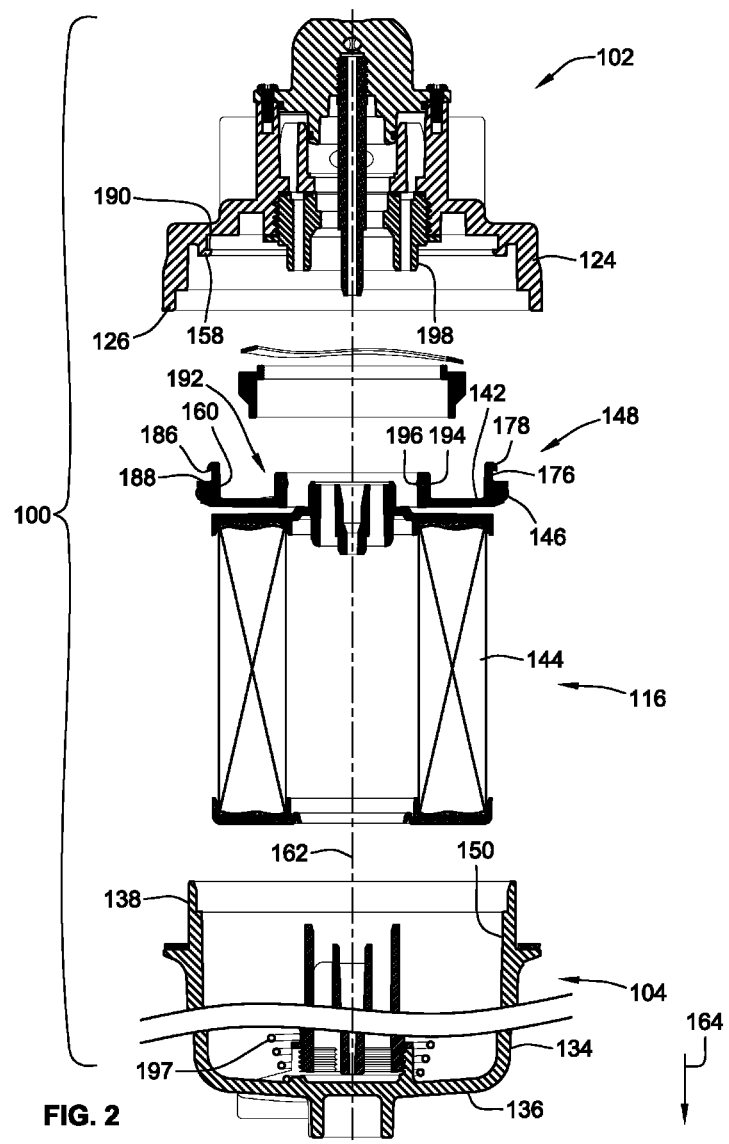
FIG. 2 is a partially exploded cross-sectional illustration of the filter arrangement of FIG. 1.

With additional reference to FIG. 2, the filter element 104, as noted above, is generally provided by the filter housing 114 and the filter cartridge 116. The filter housing 114 generally includes an annular sidewall 134 and a closed bottom 136. The closed bottom 136 may, however, include drain valves or other openings. Opposite the closed bottom 136 is an open end 138 that is generally provided by a distal end of the annular sidewall 134. The open end is sized for sliding receipt and removal of the filter cartridge 116 into and from the filter housing 114. As noted above, the housing 114 provides threads 120 that are used to secure the filter element 104 to the filter base 102. These threads 120 extend radially outward from the outer surface of the annular sidewall 134.

In the illustrated embodiment, the filter housing 114 is generally configured to be a reusable component of the filter arrangement 100.

The filter cartridge 116 is configured to be a replacement repair component. As such, at standard maintenance intervals or when the filter cartridge 116 is otherwise spent, the filter cartridge 116 is removed from the filter housing 114 through open end 138 and discarded. A new filter cartridge 116 is axially inserted into the filter housing 114 through open end 138 and the filter element 104 is reattached to the filter base 102.

In the illustrated embodiment, the filter cartridge 116 includes a first end cap 142. Attached to the first end cap 142 is a cylindrical ring of filter media 144. At an opposed end of the cylindrical ring of filter media 144 is a second end cap 146 sealingly secured to the cylindrical ring of filter media 144. The filter media 144 separates the dirty fluid inlet from the clean fluid outlet such that fluid flow through the system must pass through the filter media 144 without bypassing the media 144 so that the impurities are removed therefrom as the fluid flows through the filter arrangement 100 from the dirty fluid inlet 106 to the clean fluid outlet 108.

The filter element 104 includes a housing seal 146 that forms a radial seal between the first end cap 142 and the filter housing 114. The housing seal 146 forms part of an outer rim 148 of the filter cartridge that radially engages the filter housing 114. The inner surface 150 of the filter housing 114 defines a radially inward directed sealing surface 152 that cooperates with the radially outer rim 148 of the filter cartridge 116, and particularly the housing seal 146.

The engagement between the housing seal 146 and the sealing surface 152 can provide a significant frictional engagement between the filter housing 114 and the filter cartridge 116. This frictional engagement can make it difficult to remove the filter cartridge 116 from the filter housing 114, at maintenance intervals. As such, when an operator attempts to remove the filter cartridge 116 from the filter housing 114, it can take large amounts of axial force that can result in splashing or spilling of fluids within the filter element 104. Similarly, such removal in prior designs may require the user to manually grip or engage the filter cartridge. This can expose the operator to the fluid within the filter element.

Typically, the engagement between the filter housing 114 and the filter cartridge 116 is such that the filter cartridge 116 cannot be removed from the filter housing 114 by merely tipping the filter element 104 upside down such that the force of gravity would pull the filter cartridge 116 from the filter housing 114.

Therefore, the illustrated embodiment incorporates an auto-ejecting interface between the filter element 104 and the filter base 102. The auto-ejecting interface is configured to transition the filter cartridge 116 to a released position relative to the filter housing 114, where the filter cartridge 116 can be removed from the housing 114 using a first amount of axial force (preferably gravity), from an inserted position, where a second greater amount of axial force is required to move the filter cartridge 116 relative to housing 114, relative to the filter housing 114. More particularly, the auto-ejecting interface transitions the filter cartridge 116 to the released position from the inserted position as the filter element 104 is unmounted from the filter base 102 (i.e. transitioned from a mounted state to an unmounted state relative to the filter base 102).

As the filter element 104 is transitioned from the mounted state to the unmounted state, the auto-ejecting interface will transition the filter cartridge 116 from the inserted position to a released position where it can be easily removed from the filter housing 114. Preferably, the released position of the filter cartridge 116 is such that the filter cartridge 116 can be removed from the filter housing 114 merely by tipping the filter housing 114 upside down and allowing gravity to remove the filter cartridge 116 from the filter housing 114. In the inserted position, the filter cartridge 116 will preferably not slide under the force of gravity relative to the filter housing 114.

The auto-ejecting interface of the illustrated embodiment is provided by cooperating catch portions of the filter cartridge 116 and the filter base. The catch portion of the filter base 102 is provided by a pair of filter base abutment shelves 158 that are part of the filter base 102. The catch portion of the filter element 104 is provided by the filter cartridge 116 and particularly by a pair of filter cartridge abutment catch portions 160. The filter cartridge abutment catch portions 160 axially engage corresponding ones of the filter base abutment shelves 158 and particularly abutment surfaces 190 thereof that face axially away from the media of the cartridge 116 (see e.g. FIGS. 1, 2, 4, and 21). This engagement limits the motion of the filter cartridge 116 relative to the filter base 102 as the filter element 104 is transitioned from a mounted stated to the unmounted state. By limiting the motion of the filter cartridge 116, the filter cartridge 116 transitions from the inserted state to the released state as the filter element 104 is transitioned from the mounted state to the unmounted state along a mounting axis 162.

As the filter element 104 is rotated about the mounting axis 162 to disconnect the filter element 104 from the filter base 102, the filter cartridge abutment catch portions 160 will abut the filter base abutment shelves 158 and stop the axial motion of the cartridge 116 along the mounting axis 162. However, the continued rotation of the housing 114 about the mounting axis 162 will continue to transition the filter housing 114 away from the filter base in a direction generally illustrated by arrow 164 (see FIG. 1). Because the motion of the cartridge 116 is limited in the axial direction along mounting axis 162, but the motion of filter housing 114 is not, the filter housing 114 will move axially relative to the filter cartridge 116. This motion will cause the outer rim portion 148 of the filter cartridge 116 to slide axially along sealing surface 152 and disengage the sealing surface 152 of the housing 114 upon sufficient axial motion of the filter housing 114 relative to the filter base 102 along axis 162.

In a preferred embodiment, the filter base 102 includes removal notches 168 angularly adjacent to the ends of the filter base abutment shelves 158 and angularly interposed therebetween (see FIGS. 4-7). The removal notches 168 are configured to allow the filter cartridge abutment catches 160 to pass axially therethrough when aligned therewith to disengage the filter cartridge 116 from the filter base 102. Preferably, the filter cartridge abutment catches 160 are oriented relative to the threads 120 of the filter housing 114 such that when the threads 120 of the filter housing 114 disengage from the threads 122 of the filter base 102, the filter cartridge abutment catches 160 are aligned with a corresponding one of the removal notches 168 to permit axially removing the filter element from the filter base. Alternatively, the threads 120 of the filter housing 114 may disengage from the threads 122 of the filter base 102 prior to the filter cartridge abutment catches 160 angularly aligning with the removal notches 168. However, the user will then be required to rotate the housing 114 until the filter cartridge abutment catches 160 align with the removal notches 168.

In a preferred embodiment, with additional reference to FIG. 3, the filter cartridge 116 includes an angular keying structure that cooperates with a corresponding keying structure of the filter housing 114 to proper angularly align the filter cartridge abutment catches 160 relative to the threads 120 of the filter housing so as to cause the filter cartridge abutment catches 160 to align with the removal notches 168 as the filter element 104 is being removed from the filter base 102. The keying arrangement in the illustrated embodiment is provided by a radially extending tab 170 formed proximate the outer rim 148 of the first end cap 142. The radially extending tab 170 will axially insert into radially formed slots 172 formed in the inner surface 150 of the filter housing 114. This engagement will prevent angular movement of the filter cartridge 116 relative to the filter housing 114. Therefore, as the filter element 104 is being rotationally attached or detached from the filter base 102, the filter cartridge 116 will stay in a substantially coordinated angular position relative to the filter housing 114.

Figure 4:
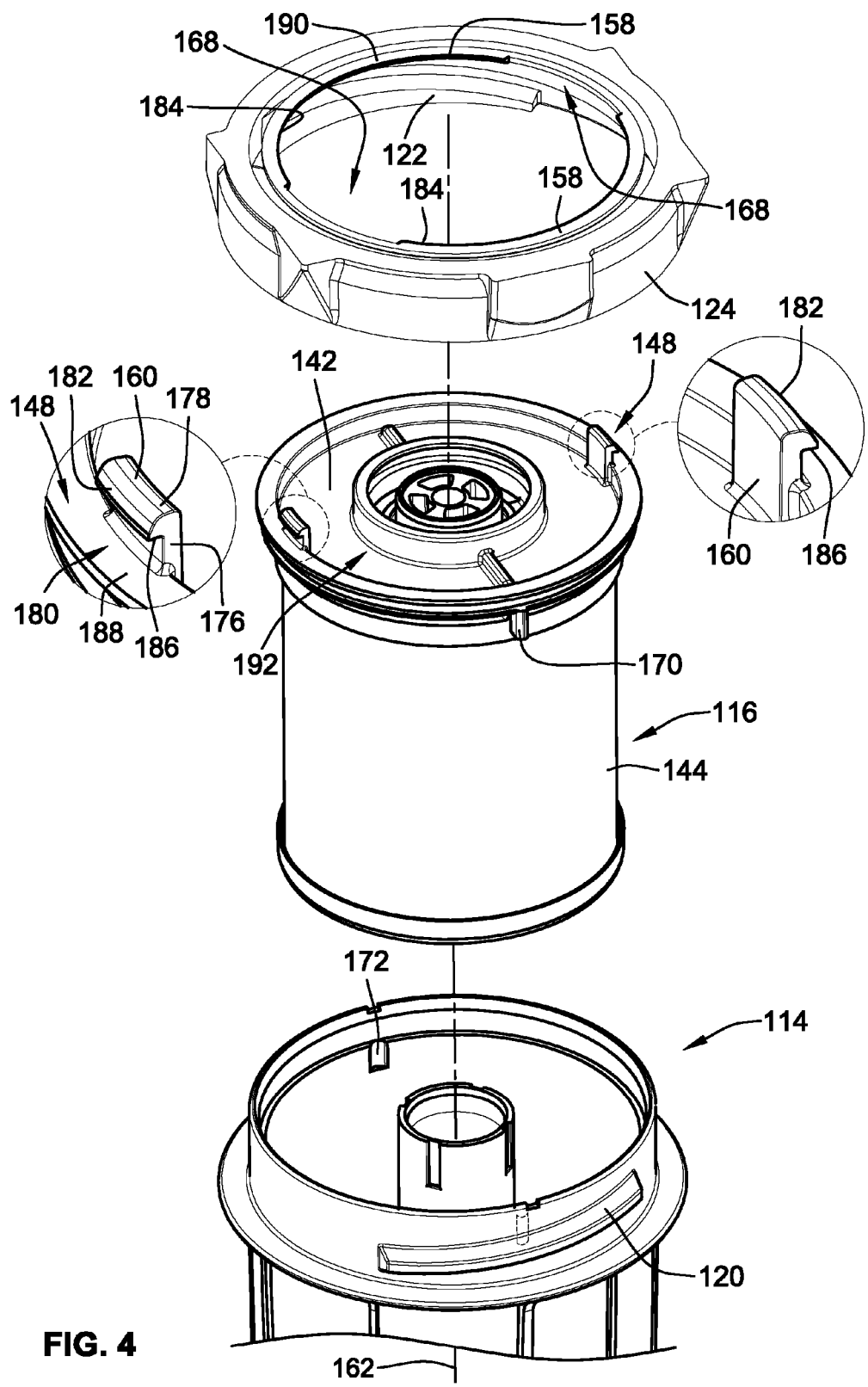
FIG. 4 is a further partial exploded perspective illustration of the filter arrangement of FIG. 1 taken at cross-section 4-4 of FIG. 1.

With reference to FIG. 4, the filter cartridge abutment catches 160 generally include an axially extending leg portion 176 and a radially extending head portion 178. The head portion 178 extends radially outward from a distal end of the leg portion 176 forming an undercut region 180 between rim portion 148 and head portion 178. The leg portion 176 is configured to flex radially inward toward axis 162 during the installation process of the filter element 104 to the filter base 102.

To promote radially inward directed flexure of the leg portion 176, the filter cartridge abutment catches 160, and particularly the head portion 178 thereof, includes a tapered end face 182 that faces generally axially away from the filter media 144. The tapered end face 182 also tapers radially inward when moving axially away from the filter media 144. This tapered end face 182 also forms or acts as a cam surface that will slide on the radially inner edge portions 184 of the filter base abutment shelves 158 as the filter element 104 is mounted to the filter base 102.

The undercut region 180 of the filter cartridge abutment catches 160 is formed between an abutment surface 186 of the head portion 178 and a top surface 188 of the outer rim portion 148. The abutment surface 186 generally axially faces the filter media 144. In the mounted state, the abutment surface 186 will axially face a corresponding abutment surface 190 of the filter base abutment shelf 158. The abutment surface 190 axially faces away from the filter media 144 or toward the filter base 102 when the filter element 104 is attached to the filter base 102. As such, the abutment surfaces 186, 190 axially face one another when the filter element 104 is mounted to the filter base 102. When the filter element 104 is removed from the filter base 102, the abutment surfaces 186, 190 will axially engage one another as the filter element 104 moves axially away from the filter base along axis 162 in the dismounting direction 164 to limit the axial movement of the filter cartridge relative to the filter base 102.

While the current filter base abutment shelves 158 and filter cartridge abutment catches 160 are configured such that the filter base abutment shelves 158 are radially inward extending flanges and the filter cartridge abutment catches 160 include the radially outward head portions 178 these arrangements could be reversed such that the head portion 178 extends radially inward and the filter base abutment shelves 158 extend radially outward.

With primary reference to FIGS. 4-10, the mounting process of the filter element 104 to the filter base 102 will be described. The user will first install the filter cartridge 116 into the filter housing such that the filter cartridge 116 is in the inserted position with the housing seal 146 engaged with the sealing surface 152 and key 170 in slot 172.

Figure 5:
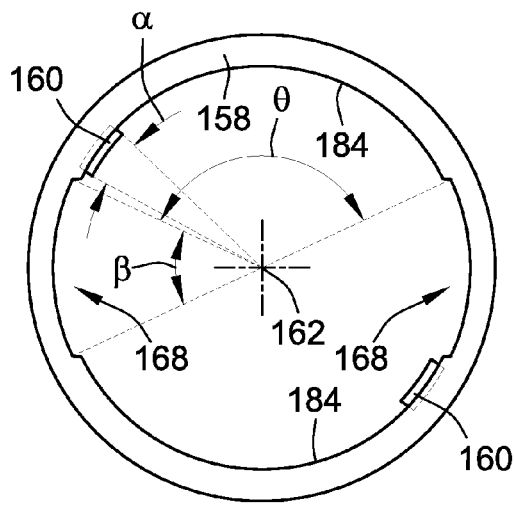
FIGS. 5-7 are simplified illustrations of the interaction between the components of the self-ejecting mechanism of the filter arrangement of FIG. 1.
Figure 11:
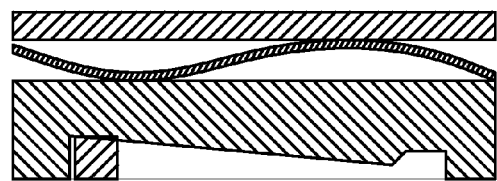
FIGS. 11-13 illustrate in simplified form the torsion lock engagement of the filter arrangement of FIG. 1.
Figure 8:
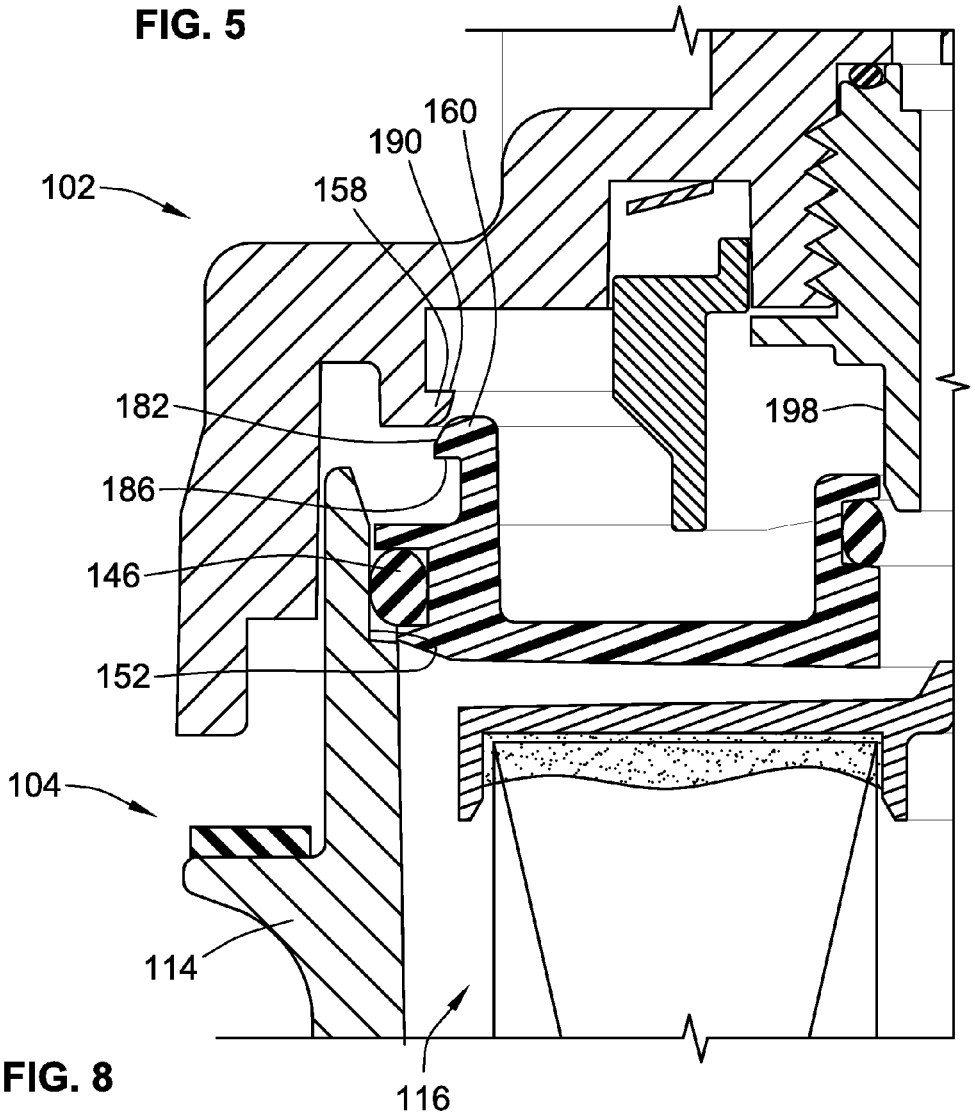
FIGS. 8-10 are cross-sectional illustrations of the filter arrangement in the same orientation as in FIGS. 5-7.
Figure 6:
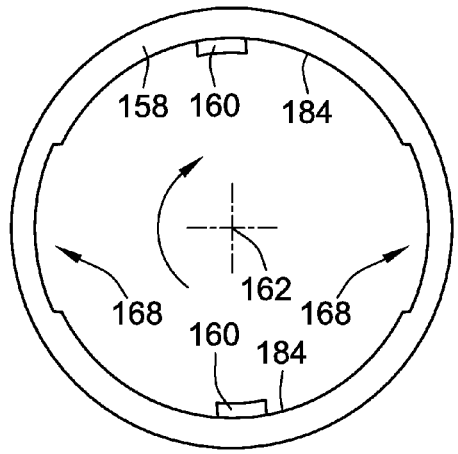
Figure 12:
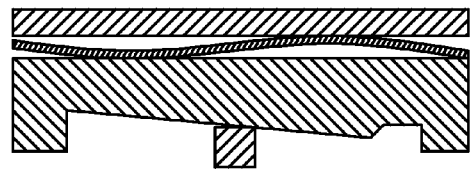
Figure 9:
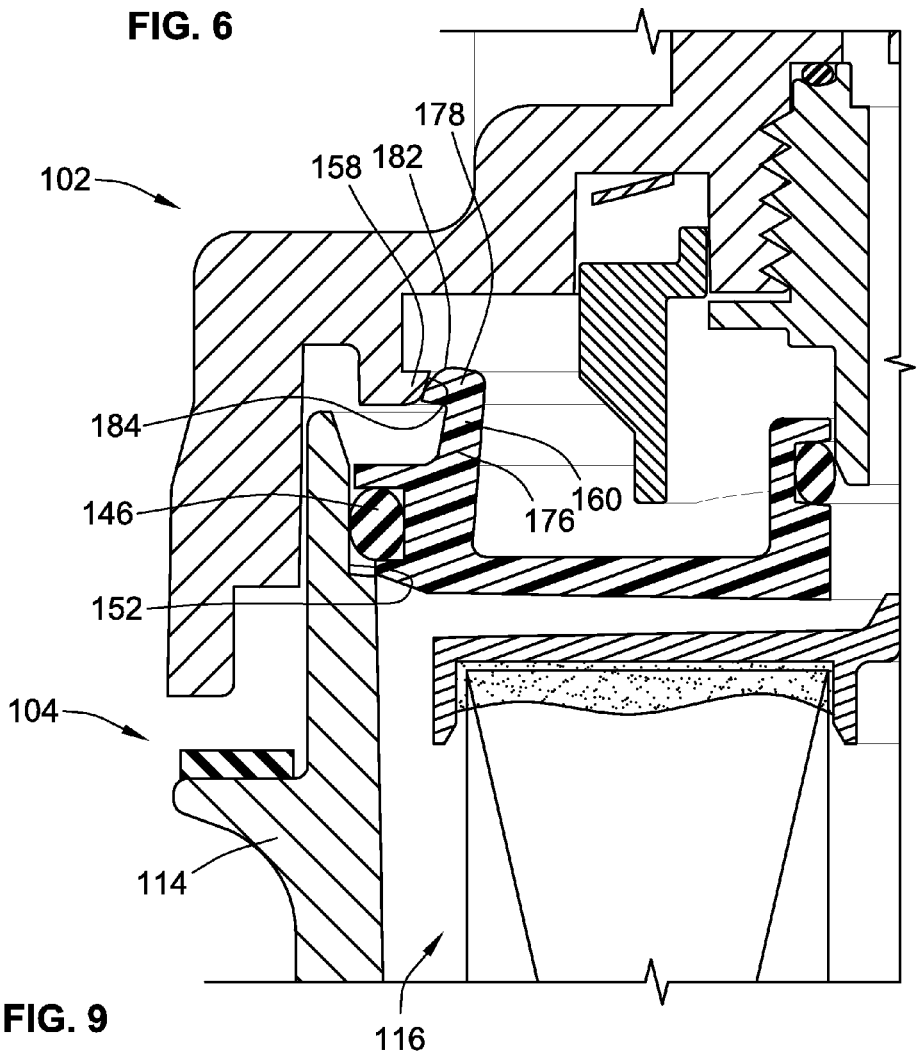
Figure 7:
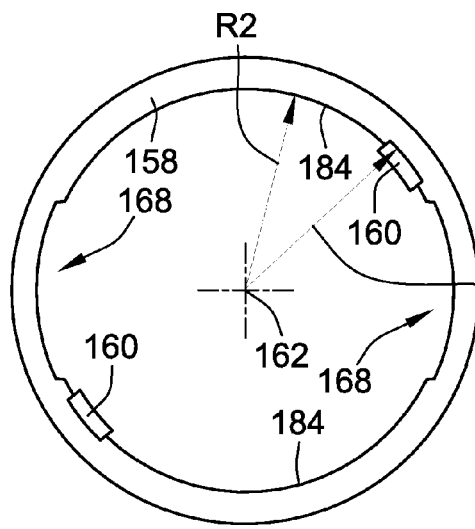
Figure 13:
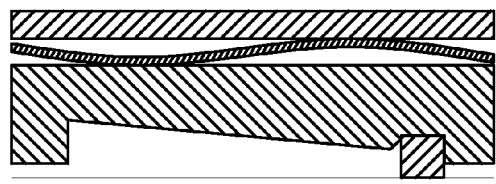
Figure 10:
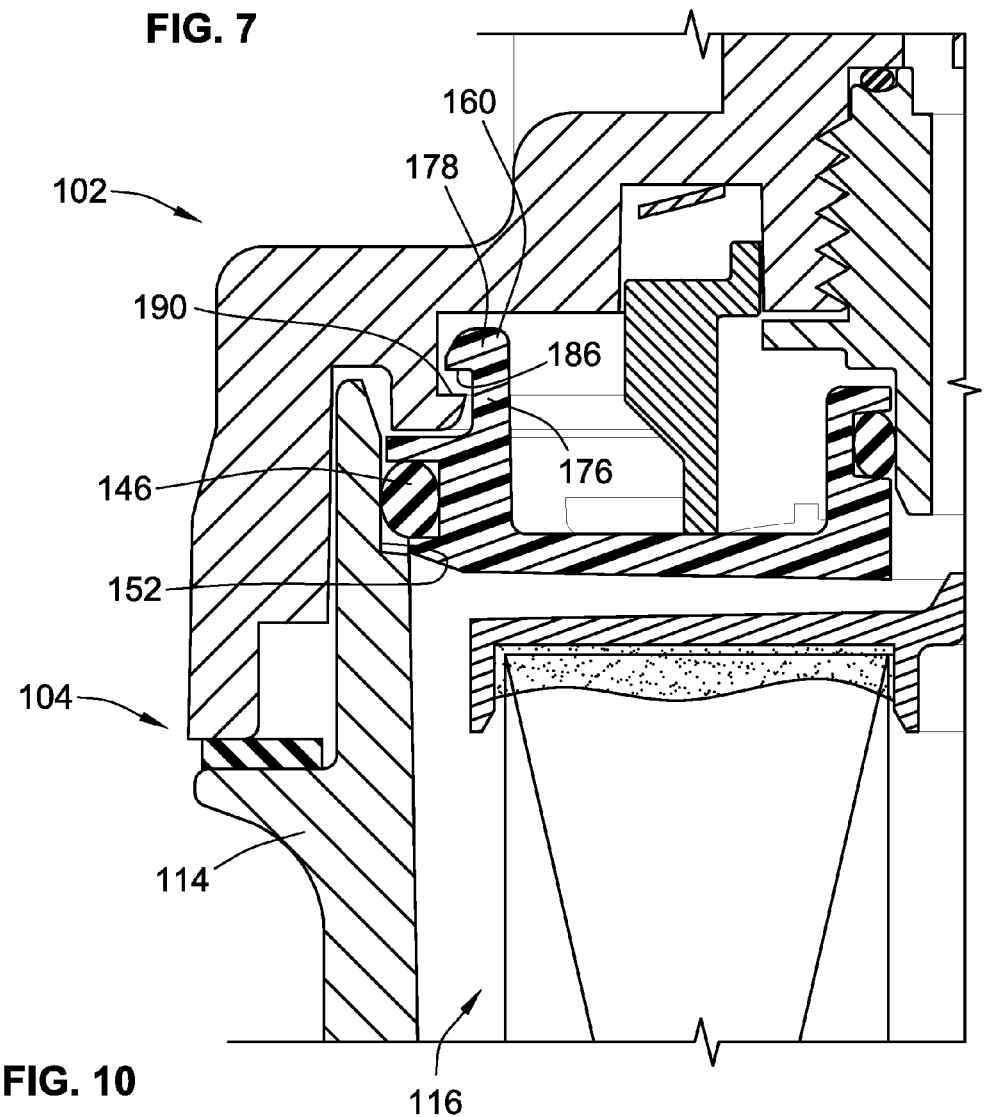
Figure 14:
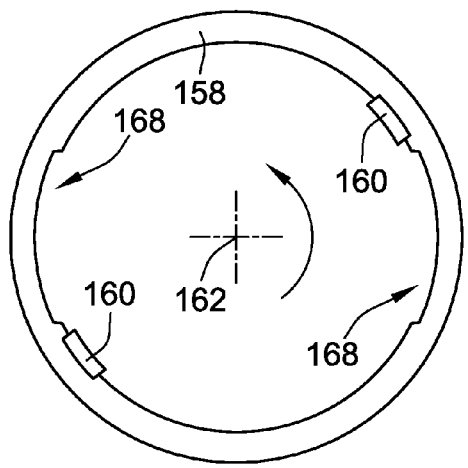
FIGS. 14-16 are similar to FIGS. 5-7 but during the removal process.
Figure 17:
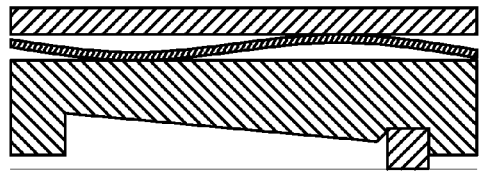
FIGS. 17-19 are similar to FIGS. 11-13 and illustrate the torsion lock arrangement in simplified form during the removal process.
Figure 20:
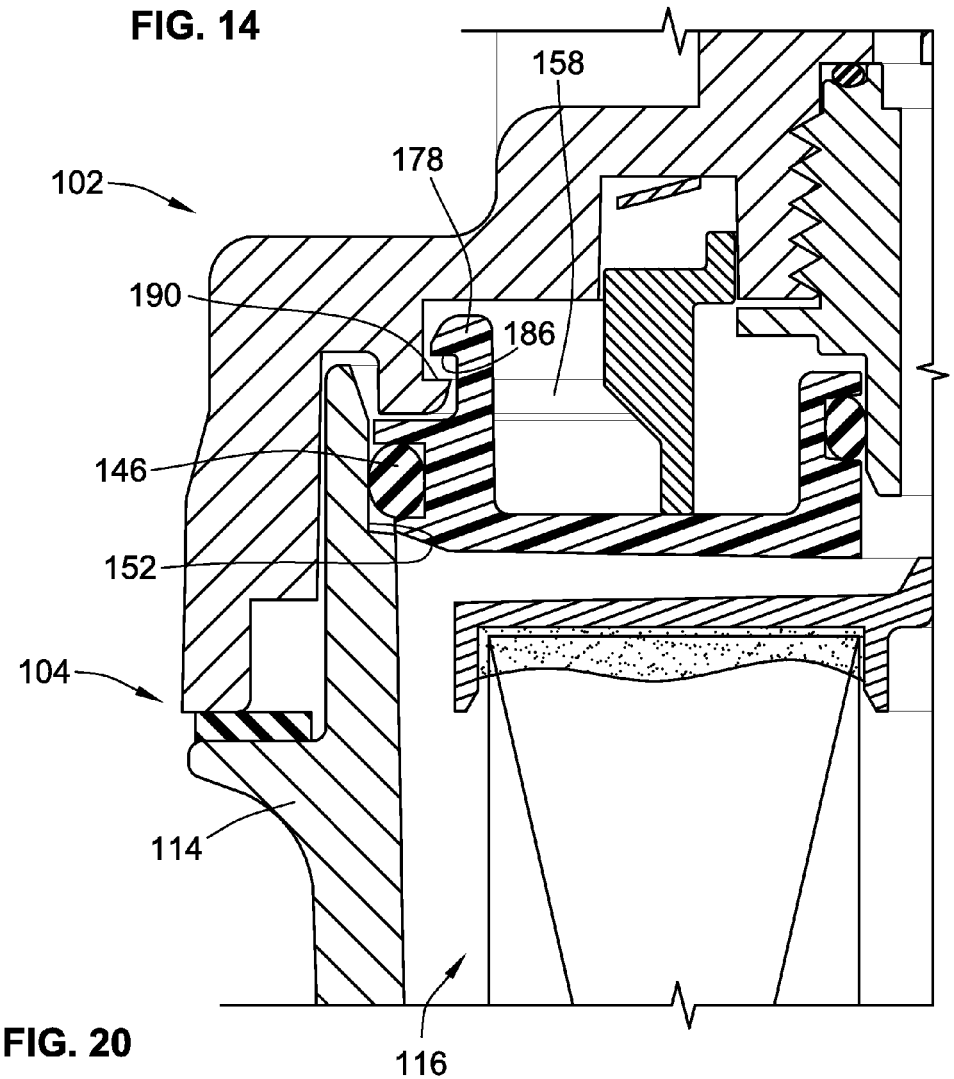
FIGS. 20-22 are similar cross-sectional illustrations as FIGS. 8-10 during the removal process.
Figure 15:
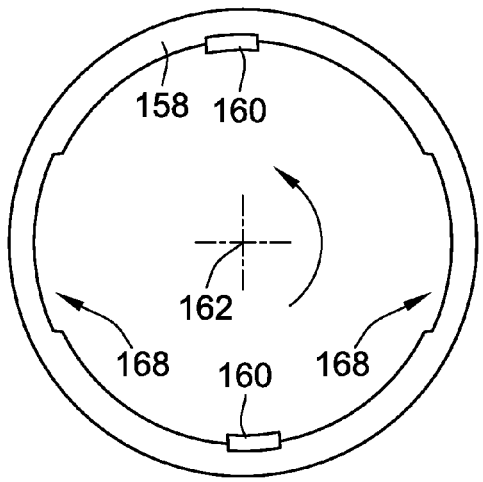
Figure 18:
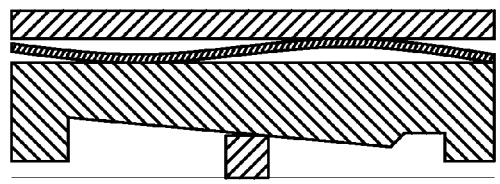
Figure 21:
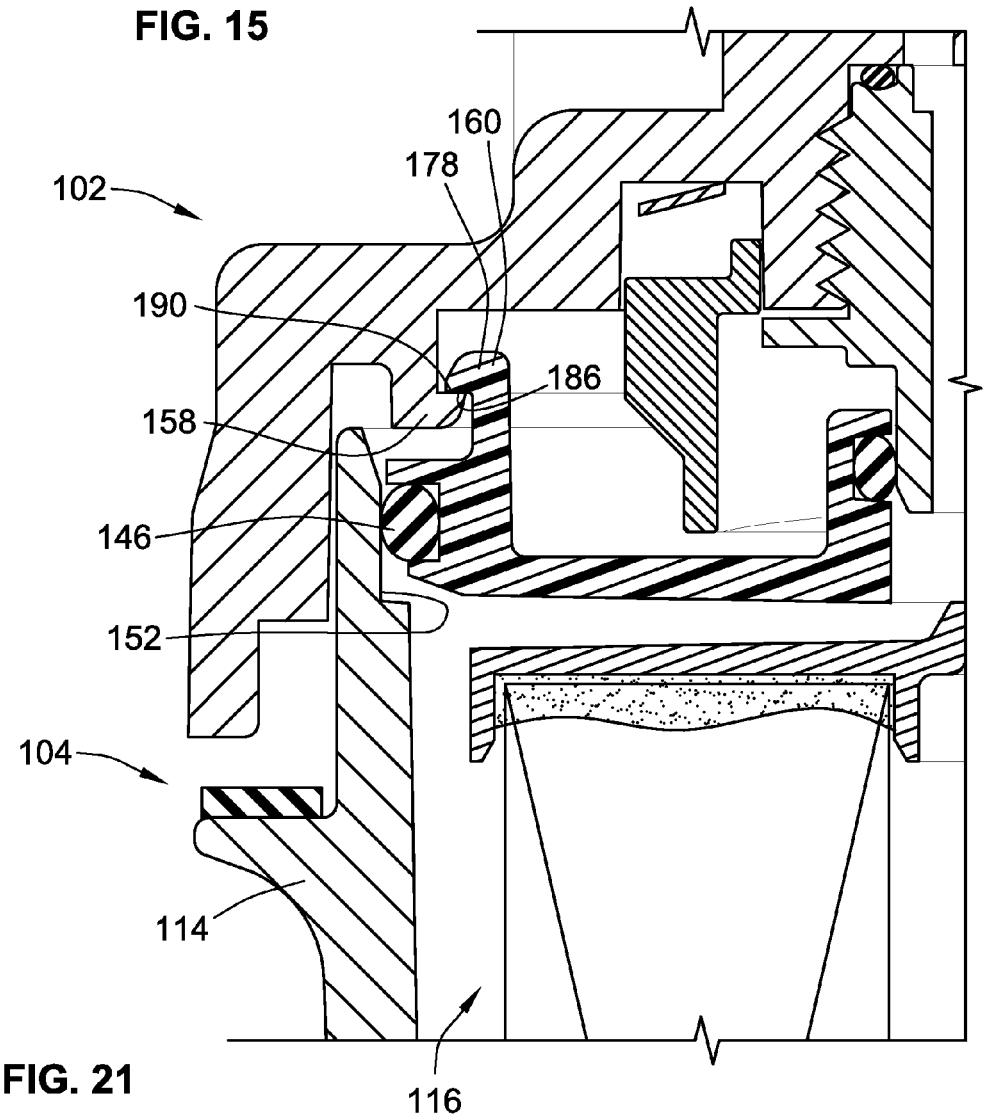
Figure 16:
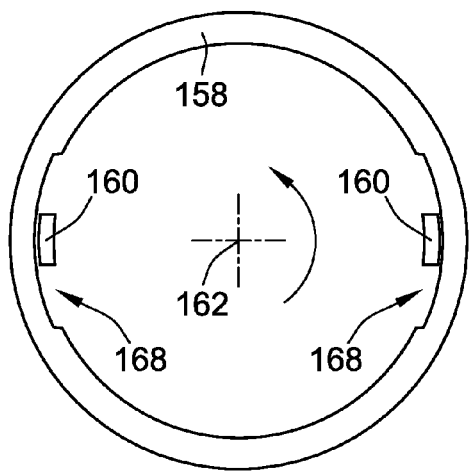
Figure 19:
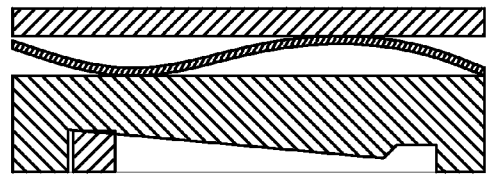
Figure 22:
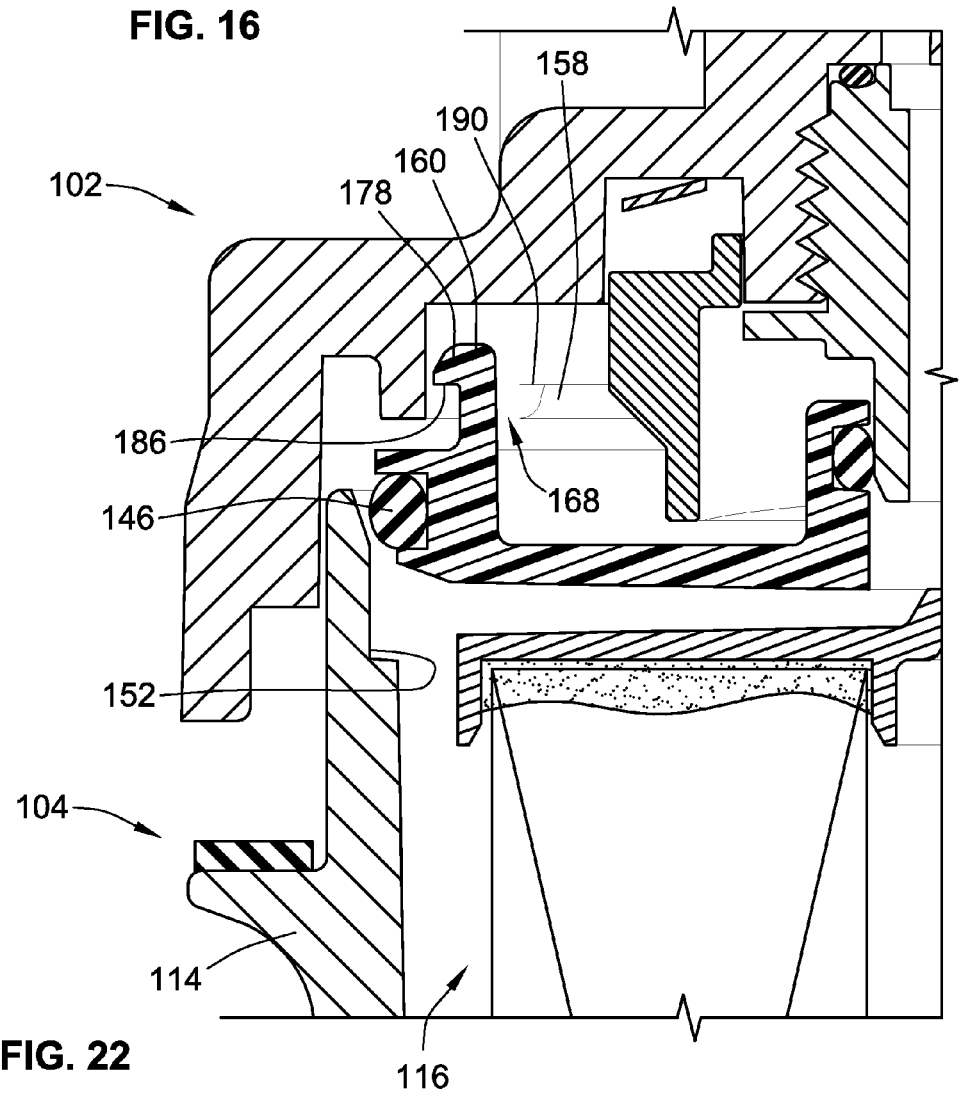
Figure 23:
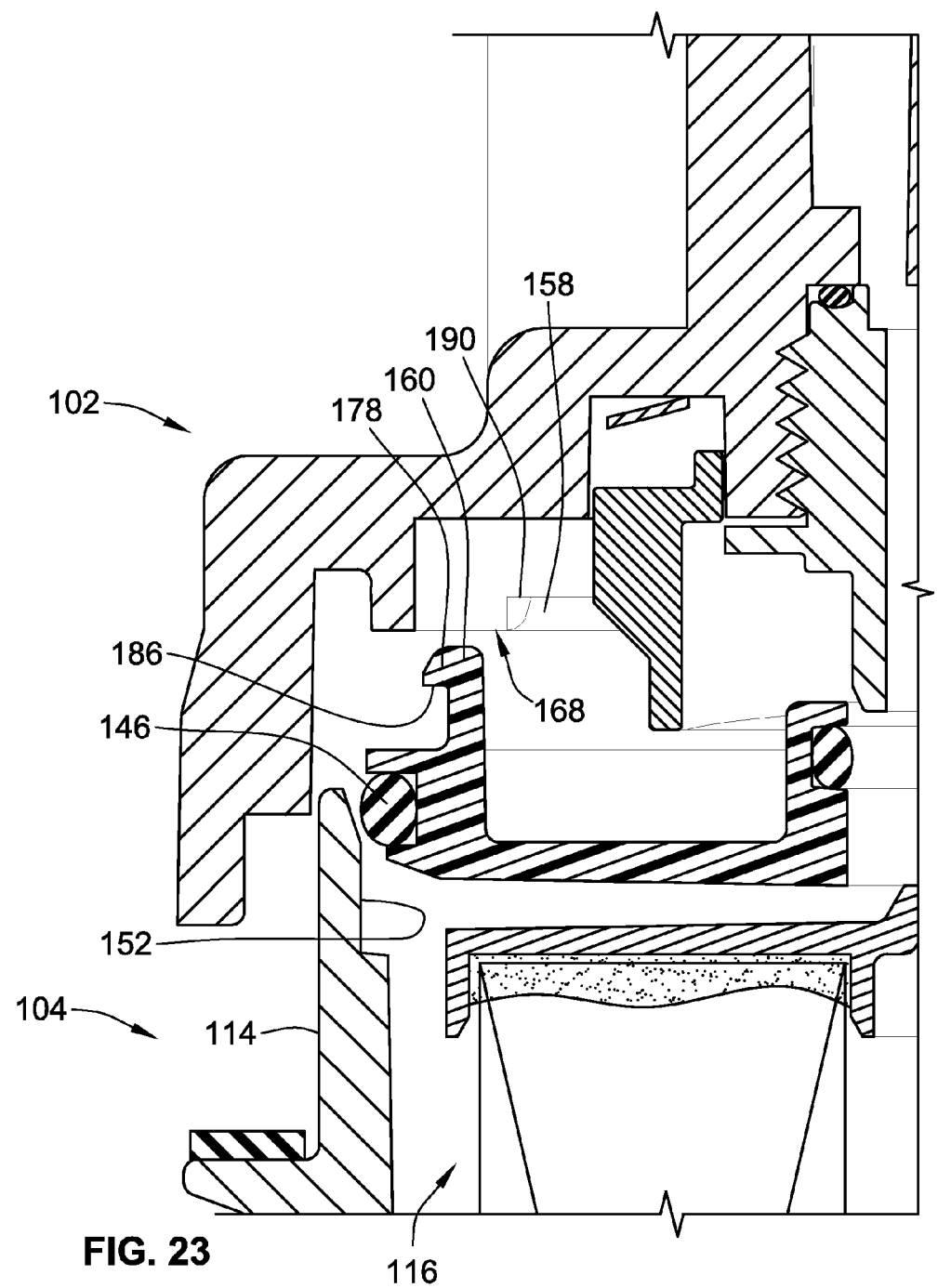
FIG. 23 further illustrates removal of the filter cartridge from the filter housing as the filter element is removed from the filter base according to an embodiment of the present invention.

The user will then begin to thread the housing 114 to the filter base 102 (see FIGS. 5 and 8). At this point, it is preferred that the filter cartridge abutment catch 160 does not axially abut the filter base abutment shelf 158 on the side opposite side 190. This allows the initial engagement between the cooperating threads 120, 122 to be easily started without interference by the auto-ejections interface. With reference to FIGS. 6 and 9, the filter element 104 has been rotated angularly about the axis 162 and been drawn axially into the filter base 102 such that the filter cartridge abutment catches 160 have abutted the filter base abutment shelves 158. Further, the leg portion 176 have flexed radially inward as the tapered end face slides along the radially inner edge portion 184. This flexure permits the filter cartridge abutment catch 160 to pass axially past the filter base abutment shelf 158 as the filter element 104 is mounted to the filter base 102 and transitioned towards the mounted state. With reference to FIGS. 7 and 10 after the filter cartridge 104 has moved a sufficient distance along the mounting axis 162, the head portion 178 will pass the filter base abutment shelf 158 such that the abutment surfaces 186, 190 axially face one another as discussed above. The leg portions 176 will spring back such that the inner edge portion is positioned radially within undercut region 180. In this state, the filter element 104 is in the mounted position.

To remove the filter element 104 from the filter base 102, the user will rotate the filter element 104 in the opposite direction as for mounting the filter element 104. As the filter element 104 rotates relative to the filter base 102, the head portion 178, and particularly the abutment surface 186 of the head portion 178, of the filter cartridge abutment catches 160 will slide along the abutment surfaces 190 of the filter base abutment shelf 158. As the filter element 104 is being rotated, the filter housing 114 is being moved axially away from the filter base along axis 162. However, the engagement between the abutment surfaces 186, 190 prevents corresponding axial motion of the filter cartridge 116. As such, the filter cartridge 116 moves axially relative to the filter housing 114.

The filter element 104 will be rotated a sufficient angular distance until the filter cartridge abutment catches 160 are located within the removal notches 168. At that time, the threads 120, 122 will disengage and the filter element 104 can be removed from the filter base 102. Further, at that time, the filter cartridge 116 has been transitioned to the released state. During the removal process, the filter cartridge 116 translates a first distance parallel to axis 162 relative to the housing 114 between the released position and the inserted position. The filter housing 114 translates at least that first distance parallel to axis 162 as the filter housing 114 is axially translated due to the interaction between threads 120, 122.

The user can then easily remove the filter cartridge 116 from the filter housing 114, preferably by merely tipping the filter housing 114 upside down (e.g. inverting the filter housing 114).

Some other characteristics of the system will also be identified. With reference to FIGS. 5-7, the angular dimension $\alpha$ of the abutment catches 160 is less than the angular dimension $\beta$ of the removal notches 168 as well as the angular dimension $\theta$ of the filter base abutment shelves 158.

Further, the radial distance R1 of the radially outer most portion of the abutment catches 160 from axis 162 is greater than radial distance R2 of the inner edge portion 184 of the abutment shelves 158.

In the illustrated embodiment, first end cap 142 includes a central axially extending hub 194 and carries seal 196. Seal 196 radially seals against a sealing surface 198 provided by the filter base 102. The abutment catches 160 are positioned radially between the radially outer rim 148 and the central hub 192.

In one embodiment, as illustrated in FIGS. 1 and 2, a coil spring 197 is axially interposed between the filter element 102 and the filter housing 114. The coil spring 197, when compressed, axially biases the filter element 102 in a direction extending from closed bottom 136 towards open end 138 of the filter housing 114. The coil spring 197 is used to reduce the amount of force the axial engagement necessary between abutment catches 160 and shelves 158 for overcoming the frictional forces between the filter cartridge 116 and housing 114. The force provided by coil spring 197 is preferably not large enough to cause the filter cartridge 116 to be ejected from the filter housing 114 when the filter element 104 is removed from the filter base 102.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter cartridge for insertion into a housing of a filter element that is selectively mountable to a filter base, the housing having a radially inward directed sealing surface and a radially outward directed housing thread, the filter base has an annular skirt defining at least one base thread engageable with the housing thread, the filter base also defining a radially extending filter base abutment shelf, the filter cartridge comprising:
  a tubular ring of filter media defining a central cavity;
  a first end cap attached to the filter media, the first end cap including a central aperture in fluid communication with the central cavity of the tubular ring of filter media;
  an outer rim including a radially outward directed seal defining a radially outward, directed sealing surface for engaging the radially inward directed sealing surface and for forming a seal between the first end cap and the radially inward directed sealing surface;
  a second seal carried by the first end cap for sealing with the filter base; and
  a filter cartridge abutment catch including an axially extending leg portion extending from the first end cap and a head portion extending radially from the leg portion, the radially extending head portion configured to axially engage the radially extending filter base abutment shelf to impede motion of the filter cartridge relative to the filter base when the filter element is axially removed from the filter base, the radially extending head portion being positioned radially inward of the radially outward directed sealing surface, the filter cartridge abutment catch is radially outward from the second seal.

2. The filter cartridge of claim 1, wherein the leg portion is configured to flex radially to adjust the radial position of the head portion to permit the head portion to pass axially past the radially extending abutment shelf as the filter element moves axially along a mounting axis as the filter element is mounted to the filter base.

3. The filter cartridge of claim 2, wherein the head portion extends radially outward.

4. The filter cartridge of claim 1, wherein the filter cartridge abutment catch is part of the first end cap.

5. The filter cartridge of claim 1, wherein the filter cartridge abutment catch is radially outward from the second seal.

6. The filter cartridge of claim 1, wherein the filter cartridge abutment catch is radially outward from the central aperture.

7. The filter cartridge of claim 1, wherein the tubular ring of filter media defines an inner surface that bounds the central cavity, the filter cartridge abutment catch is positioned radially outward beyond the inner surface.

8. The filter cartridge of claim 1, wherein the tubular ring of filter media defines an inner surface that bounds the central cavity, the filter cartridge abutment catch is positioned axially offset from the tubular ring of filter media and is external of the central cavity of the tubular ring of filter media.

9. The filter cartridge of claim 1, wherein the outer rim is axially spaced from the filter media.

10. The filter cartridge of claim 1, wherein the filter cartridge abutment catch is radially positioned between the outer rim and the second seal.

11. The filter cartridge of claim 1, wherein the radially extending head portion defines an abutment surface axially facing towards the filter media, the filter cartridge abutment catch is positioned radially outward of the central aperture, the filter cartridge abutment catch is operably attached to the first end cap.

12. A filter cartridge comprising:
  a tubular ring of filter media;
  a first end cap attached to a first end of the filter media;
  a filter cartridge abutment catch including an axially extending leg portion and a head portion extending radially from the leg portion, the radially extending head portion defining an abutment surface axially facing towards the filter media; and
  a radially outward directed first seal proximate a radially outer rim of the first end cap for sealing the end cap to a filter housing;
  a second seal carried by the first end cap for sealing with a filter base; and
  wherein the first end cap has a central aperture in fluid communication with a central cavity of the tubular ring of filter media.

13. The filter cartridge of claim 12, wherein the filter cartridge abutment catch is part of the first end cap, the leg portion extending axially outward from a body portion of the first end cap and away from the filter media, the head portion extending radially over a portion of the body portion and forming an undercut region therebetween.

14. The filter cartridge of claim 13, wherein the head portion has an axially tapered end face that faces generally axially away from the filter media.

15. The filter cartridge of claim 14. wherein the axially tapered end face also faces radially outward and away from a center of the filter cartridge.

16. The filter cartridge of claim 14, wherein the axially tapered end face also faces radially inward and toward a center of the filter cartridge.

17. The filter cartridge of claim 12, wherein the filter cartridge abutment catch is radially outward from the second seal.

18. The filter cartridge of claim 12, wherein the filter cartridge abutment catch is radially outward from the central aperture.

19. The filter cartridge of claim 12, wherein the tubular ring of filter media defines an inner surface that bounds the central cavity, the filter cartridge abutment catch is positioned radially outward beyond the inner surface.

20. The filter cartridge of claim 12, wherein the tubular ring of filter media defines an inner surface that bounds the central cavity, the filter cartridge abutment catch is positioned axially offset from the tubular ring of filter media and is external of the central cavity of the tubular ring of filter media.

21. The filter cartridge of claim 12, wherein the first seal is axially spaced from the filter media.

* * * * *